US010383172B2

(12) United States Patent
Baldwin et al.

(10) Patent No.: US 10,383,172 B2
(45) Date of Patent: Aug. 13, 2019

(54) METHOD AND APPARATUS FOR A SINGLE UNIT SMALL, LOW-POWER BASE STATION SUPPORTING BOTH METRO CELL OUTDOOR (MCO) AND METRO RADIO OUTDOOR (MRO) OPERATIONS

(71) Applicants: John Baldwin, Morristown, NJ (US); Peter Laconte, Woodland Park, NJ (US); Michael Kolodchak, Freehold, NJ (US); Michael Lemke, Plainfield, IL (US)

(72) Inventors: John Baldwin, Morristown, NJ (US); Peter Laconte, Woodland Park, NJ (US); Michael Kolodchak, Freehold, NJ (US); Michael Lemke, Plainfield, IL (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 133 days.

(21) Appl. No.: 14/501,686

(22) Filed: Sep. 30, 2014

(65) Prior Publication Data

US 2016/0095163 A1    Mar. 31, 2016

(51) Int. Cl.
*H04L 29/06* (2006.01)
*H04W 88/10* (2009.01)
*H04L 12/931* (2013.01)

(52) U.S. Cl.
CPC .......... *H04W 88/10* (2013.01); *H04L 49/351* (2013.01); *H04L 69/08* (2013.01); *Y02D 70/00* (2018.01); *Y02D 70/1262* (2018.01)

(58) Field of Classification Search
CPC . H04W 88/10; H04W 48/06; H04W 72/1215; H04W 76/04; H04W 40/02; H04W 28/06; H04L 12/5692; H04L 69/08; H04L 5/003
USPC .... 370/328, 329, 466, 503, 338, 396, 241.1; 455/446, 436, 522.1, 561
See application file for complete search history.

(56) References Cited

U.S. PATENT DOCUMENTS 8,300,590 B1 *  10/2012  Negus ............... H04B 7/0691
                                                 370/329
8,798,678 B2 *  8/2014   Nguyen ............. H04W 24/02
                                                 370/241.1

(Continued)

FOREIGN PATENT DOCUMENTS

EP    WO 2014/121846    *  8/2014  ........... H04W 88/08

*Primary Examiner* — Ivan O Latorre
(74) *Attorney, Agent, or Firm* — Harness, Dickey & Pierce, P.L.C.

(57) ABSTRACT

A single unit with a backhaul interface and radio card able to support both metro cell outdoor (MCO) and metro radio outdoor (MRO) operations. The single unit includes a switch used to switch between these operational modes. The single unit is versatile from the standpoint that MCO or MRO operations may be selected at the time of installation, and this selection may be changed at any time while operating. The single unit configuration provides a low power MRO mode requiring up to 80% less power than the MCO mode, as the switching function of the single unit can power down all unused internal components and allow radio signals received at a backhaul interface to be exchanged directly with a radio card.

9 Claims, 7 Drawing Sheets

(56) References Cited

U.S. PATENT DOCUMENTS

| | | | |
|---|---|---|---|
| 2008/0181282 A1* | 7/2008 | Wala | H04B 1/18 375/130 |
| 2011/0075616 A1* | 3/2011 | Baldwin | H04W 88/085 370/329 |
| 2011/0237178 A1* | 9/2011 | Seki | H04W 36/18 455/3.01 |
| 2013/0003658 A1* | 1/2013 | Stewart | H04B 7/022 370/328 |
| 2013/0003677 A1* | 1/2013 | Yu | H04L 25/14 370/329 |
| 2013/0004176 A1* | 1/2013 | Sato | H04B 10/25754 398/96 |
| 2013/0089336 A1* | 4/2013 | Dahlfort | H04J 14/0282 398/115 |
| 2013/0094438 A1* | 4/2013 | Ridel | H04W 88/085 370/328 |
| 2013/0094549 A1* | 4/2013 | Ridel | H04L 27/00 375/222 |
| 2013/0208671 A1* | 8/2013 | Royz | H04W 88/10 370/329 |
| 2014/0146797 A1* | 5/2014 | Zavadsky | H04L 5/0085 370/336 |
| 2014/0146906 A1* | 5/2014 | Zavadsky | G06Q 10/087 375/267 |
| 2014/0171063 A1* | 6/2014 | Mori | H04W 52/241 455/424 |
| 2015/0098419 A1* | 4/2015 | Zavadsky | H04W 88/085 370/329 |
| 2015/0245245 A1* | 8/2015 | Chakrabarti | H04W 4/70 370/338 |
| 2015/0249549 A1* | 9/2015 | Martinotti | H04L 49/555 370/242 |
| 2015/0350931 A1* | 12/2015 | Dillinger | H04W 72/0486 370/329 |
| 2015/0382272 A1* | 12/2015 | Carichner | H04W 88/10 370/338 |
| 2017/0012668 A1* | 1/2017 | Fang | H04W 88/085 |
| 2017/0126289 A1* | 5/2017 | Fischer | H04B 7/04 |

* cited by examiner

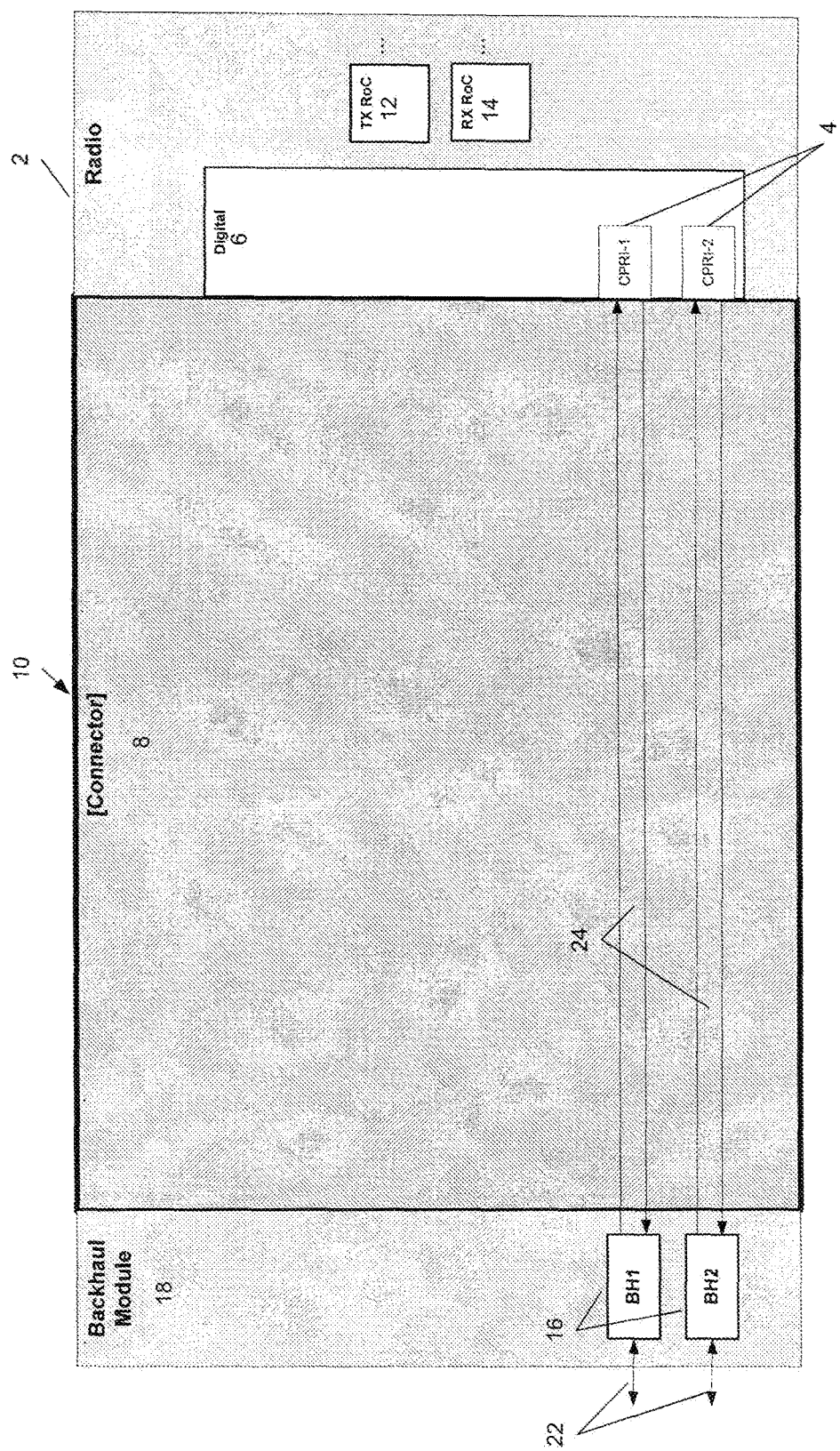
FIG. 1 (CONVENTIONAL)

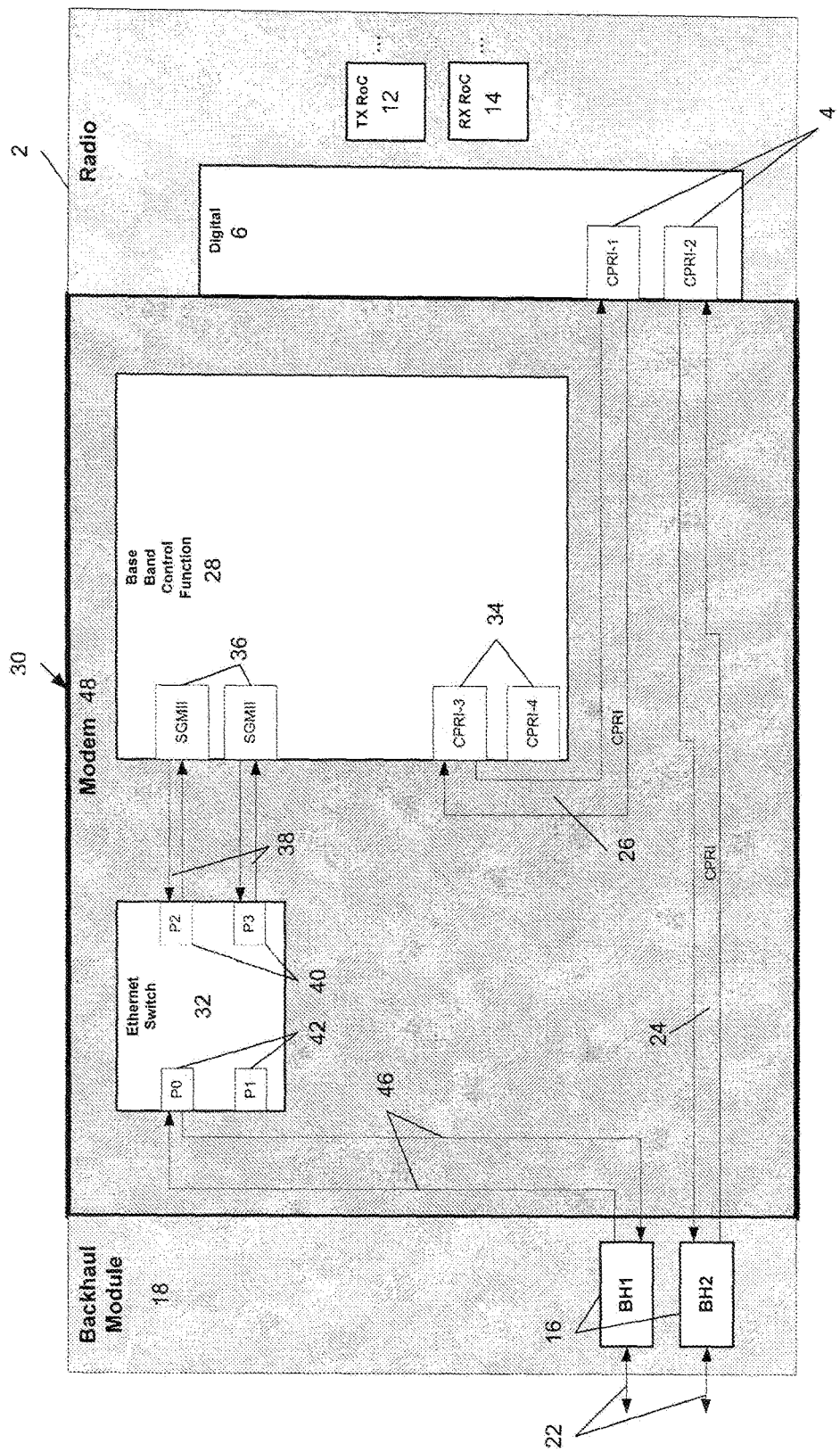
FIG. 2 (CONVENTIONAL)

METHOD AND APPARATUS FOR A SINGLE UNIT SMALL, LOW-POWER BASE STATION SUPPORTING BOTH METRO CELL OUTDOOR (MCO) AND METRO RADIO OUTDOOR (MRO) OPERATIONS

BACKGROUND OF THE INVENTION

Field of the Invention

Example embodiments relate generally to a single unit small, outdoor low-power cell able to support both metro cell outdoor (MCO) and metro radio outdoor (MRO) operations.

Related Art

In telecommunications, small, low-power cells are designed to supplement and/or replace larger macro base stations, especially in heavily populated urban areas where space is at a premium. To that end, conventionally there are two broad classes of small cells: metro cell outdoor (MCO), and metro radio outdoor (MRO).

As shown in FIG. 1, a conventional MRO 10 includes a radio card 2 which may include a digital processing radio processor 6 (containing such algorithms as Peak Limiter and Digital Pre-Distortion for radio performance) and dual common public radio interfaces (CPRI) 4 (providing digital communication to the radio with standard messaging and data, where dual connections are provided for redundancy as well as daisy-chaining with other radios). The radio card 2 may also include a radio on card transmitter (TX RoC) 12 for transmitting modulation, and a radio on card receiver (RX RoC) 14 for receiving demodulation. MRO 10 may also include a backhaul module 18 with dual backhaul interfaces 16 connected to fiber lines 22, where the backhaul interfaces 16 may be CPRI rates 3 through 7 for radio applications, those these interfaces 16 may optionally support gigabit ethernet (GigE) for cell applications (see for instance the configuration shown in FIG. 2). CPRI interfaces 4 of the radio card 2 may be connected to the backhaul interfaces 16 of backhaul module 18 via CPRI lanes 24 carrying CPRI signals that may be included in connector 8 (note that these lanes 24 may optionally be serializer/deserializer (SERDES) GigE for cell applications, as shown in FIG. 2).

As shown in FIG. 2, a conventional MCO 30 for modem and radio processing may include a radio card 2 and backhaul module 18 with similar components as described in FIG. 1 (and therefore those components are not again described here). However, in contrast to FIG. 1, MCO 30 may include a modem 48 connecting backhaul module 18 to radio card 2. The modem card 48 may include an Ethernet switch 32 and base band controller 28 for long-term evolution (LTE) processing. The Ethernet switch 32 may be used to direct Ethernet packets (packets conforming to IP protocol) internally within modem 48. Specifically, Ethernet switch 32 may include Ethernet port interfaces 42 (see ports P0 and P1) which terminate Serial Gigabit Media Independent Interface (SGMII) signals (i.e., IP protocol data) carried to/from Ethernet switch 32 and backhaul interfaces 16 via SGMII SERDES lanes 46. Ethernet switch 32 may also include Ethernet port interfaces 40 (see ports P2 and P3) which terminate SGMII signals carried to/from SGMII interfaces 36 of base band controller 28 via SERDES SGMII lanes 38. The SGMII interfaces 36 may be serial gigabit media independent interfaces used to transport control and data packets to the network. Base band controller 28 may also include internal CPRI core interfaces 34 that send/receive CPRI signals to CPRI interfaces 4 of radio card 2 via SERDES lanes 26, where base band controller 28 may convert CPRI signals to SGMII signals and vice versa.

Due to the structural differences between the hardware configuration of the conventional MRO 10 and MCO 30, both types of equipment must be utilized in the field in order to provide metro radio services and metro cell services to user equipment (UE) of a wireless network.

SUMMARY OF INVENTION

Some example embodiments provide a method and/or apparatus for a single unit small, outdoor low-power base station able to support both metro cell outdoor (MCO) and metro radio outdoor (MRO) operations. In one embodiment, a single unit base station may include a switch that is capable of switching received signals between MCO and MRO operations. The single unit base station is versatile from the standpoint that the base station may be easily switched between MCO and MRO operations at the time of installation, and the base station may be changed between MCO and MRO operations at any time during operation. The single unit base station configuration may also provide a low power MRO mode requiring up to 80% less power than the MCO mode, as the switching function of the single unit may power down all active components such that CPRI signals received at the backhaul interfaces may be sent directly to a radio card.

In one embodiment, a single unit may include a backhaul interface; a radio card configured to exchange data communication with the backhaul interface; a first controller configured to convert internet protocol (IP) data to radio signals, the first controller being a base band controller; and a first switch configured to route IP data communication between the backhaul interface and the radio card through the first controller, and route radio signal data communication directly between the backhaul interface and the radio card.

In one embodiment, a method of configuring a single unit having a backhaul interface capable of exchanging data communication with a radio card may include configuring a first controller in the single unit to convert internet protocol (IP) data into radio signals, the first controller being a base band controller; and configuring a first switch in the single unit to route IP data communication between the backhaul interface and the radio card through the base band controller, and route radio signal data communication directly between the backhaul interface and the radio card.

In one embodiment, a method of using a single unit having a backhaul interface capable of exchanging data communication with a radio card, may include selecting, by a first switch controlled by a first controller, one of a metro cell outdoor (MCO) mode and a metro radio outdoor (MRO) mode, the first switch routing internet protocol (IP) data communication between the backhaul interface and the radio card through a second controller in the MCO mode, the second controller being a base band controller configured to convert IP data into radio signals, the first switch routing radio signal data communication directly between the backhaul interface and the radio card in the MRO mode.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 is a diagram of a conventional metro radio outdoor (MRO) cell;

FIG. 2 is a diagram of a conventional metro cell outdoor (MCO) cell;

DETAILED DESCRIPTION

Figure 3A:
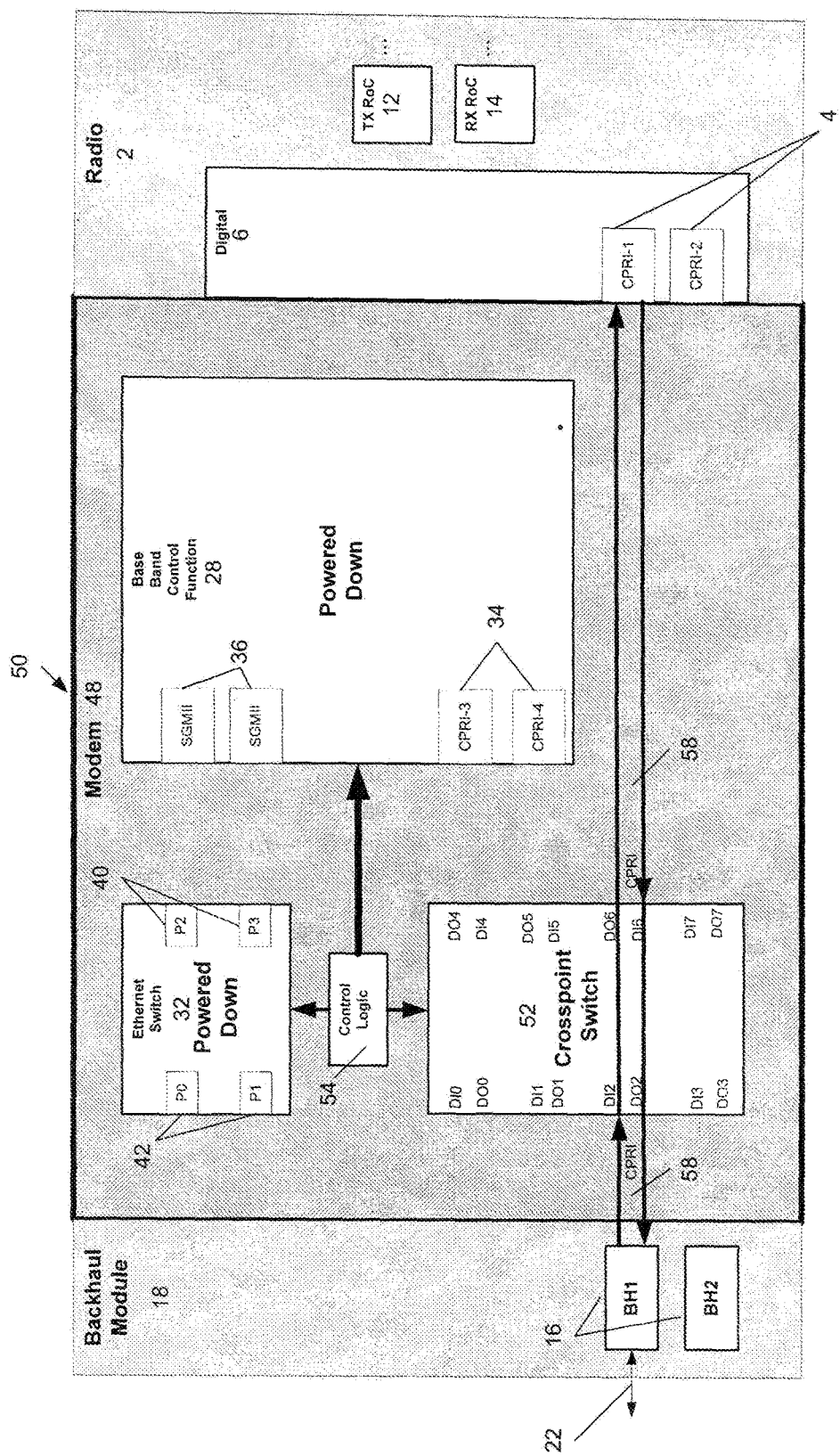
FIG. 3A is a diagram of a single unit cell (MxO) operating in a MRO mode, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 3A is a diagram of a single unit cell (MxO) 50 operating in a MRO mode, in accordance with an example embodiment. MxO 50 may support either MCO or MRO operations, though operation in MRO-only is shown in this figure (also see MxO 50 in MCO mode in FIG. 4). Because MxO 50 shares some common elements with MCO 30 (see the description of FIG. 2, above), these common elements are not described again, here.

MxO 50 may include a master controller 54 that controls the internal components of MxO 50, the function of which is described herein. A physical switch 52 such as a crosspoint switch, or any other type of switch offering a switching function capable of redirecting either CPRI or SERDES SGMII signals within modem 48 may also be included in MxO 50, in order to switch MxO 50 from MRO mode to MCO mode. In MRO mode, controller 54 causes switch 52 to receive CPRI signals 58 (entering from backhaul interface 16) and allow the signals 58 to pass directly through switch 52 and to CPRI interface 4 of radio card 2, allowing signals 58 to be freely exchanged between backhaul 16 and CPRI interface 4. The MRO-only mode allows for a significant reduction in power usage, as compared to the configuration of FIG. 4, as controller 54 may send control signals to Ethernet switch 32 and base band controller 28 in order to cause Ethernet switch 32 and base band controller 28 to power down during this more. This power savings also allows MxO 50 to operate in MRO mode at up to 80% less power than a conventional MCO 30 (as shown in FIG. 2).

It should also be understood that, as depicted in FIG. 3A, CPRI signals 58 are only shown between a single backhaul interface 16 (BH1) and a single CPRI interface 4 (CPRI-1) of the radio card 2. However, it should be understood that the other backhaul interface 16 (BH2) may carry CPRI signals to and from the other CPRI interface 4 (CPRI-2) at the same time. It should further be understood that while no active data communication is shown between switch 52, Ethernet 32 and base band controller 28, because there would be no active communication between these components in MRO mode, lanes still do exist that connect these components to each other (see lanes 66, 64 and 56 of FIG. 4, showing active communication occurring using these lanes in MCO mode).

Figure 3B:
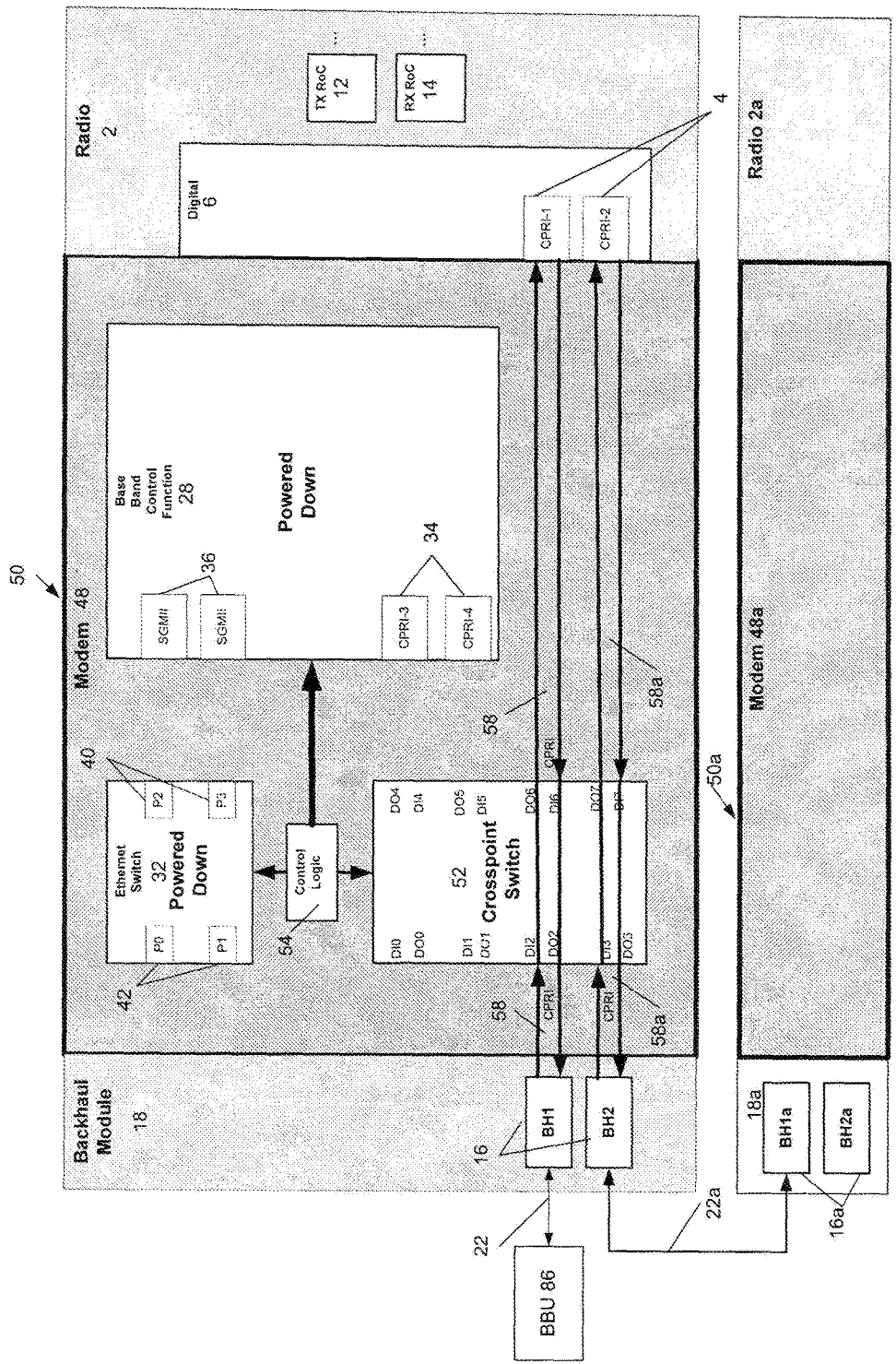
FIG. 3B is a diagram of single unit cells (MxO) in MRO mode connected in parallel, in accordance with an example embodiment.

FIG. 3B is a diagram of single unit cells (MxO) 50 in MRO mode connected in parallel, in accordance with an example embodiment. In the MRO mode, MxO 50 may be capable of supporting a 'daisy chain' configuration with another MxO 50, or a plurality of MxO 50 in series. In this configuration, CPRI radio signal 58 for use by multiple radios may be received from a base band unit 86 on backhaul BH1. The digital processing portion 6 of the radio 2 may process radio signal 58, and select a portion of the digital signal to transmit over the air via transmitter 12. The digitized radio signal 58a may then be transmitted from interface CPRI-2 of radio card 2 through backhaul interface BH2 over fiber line 22a to be received by a backhaul interface BH1a of an MxO 50a that is identical to MxO 50 (note that all of the internal components of MxO 50a are not shown to simplify the drawing). This signal 58a contains only digitized radio signals for the second MxO 50a (and, subsequent MxO units, if desired as explained herein). MxO 50a may process signal 58a in order to broadcast a select portion of signal 58a over radio card 2a. It should be understood that additional MxO units may also be included in this 'daisy chain' in a similar fashion, with Backhaul BH2a being used to transmit a radio signal to these additional units if desired. This type of configuration eliminates a need ofr separate fiber lines 22 to each individual MxO In general, use of crosspoint switch 52 within MxO 52, along with control logic 54 to allow switching between MRO mode and MCO mode (see FIG. 4), allows a variety of potential MxO configurations supporting different deployment scenarios such as MCO, MRO, MRO Daisy Chain, though this list is not exhaustive, but merely illustrative of the variety of deployment scenarios that can be addressed by the single MxO 50 unit.

Figure 4:
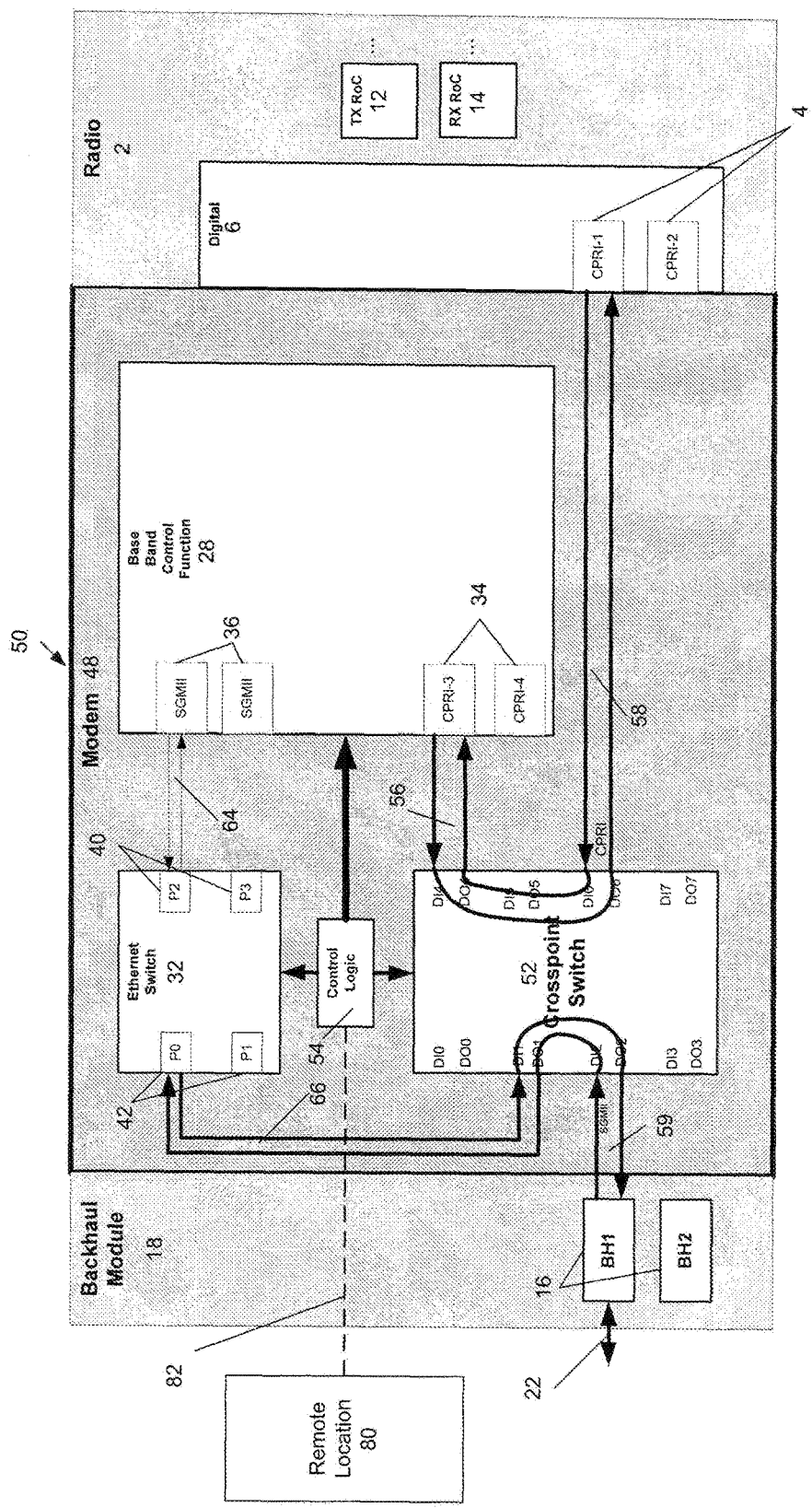
FIG. 4 is a diagram of the single unit cell (MxO) of FIG. 3A, operating in a MCO mode, in accordance with an example embodiment.

FIG. 4 is a diagram of the single unit cell (MxO) 50 of FIG. 3A, operating in a MCO mode, in accordance with an example embodiment. The switching of MxO 50 from MRO mode (FIG. 3A) to MCO mode (FIG. 4) may be accomplished manually (either prior to field installation, or in the field prior to power up and operation of MxO 50) through controller 54 sending a control signal to switch 52 in order to redirect incoming SGMII signals 59 (rather than having the signals pass through switch 52 directly to radio card 2). While this manual action of causing controller 54 to activate the switching of switch 52 may be accomplished at MxO 50 (requiring a technician to be physically at the site of MxO 50 to accomplish the switching procedure), it should be understood that this manually switching may also be accomplished remotely by sending a control signal 82 from a remote location 80 (where the remote location may be in the general vicinity of MxO 50, or a considerable distance from MxO 50 such as at central office).

In MCO mode, controller 54 may cause incoming SGMII signals 59 received at switch 52 to be redirected toward Ethernet switch 32 via CPRI lane 66. The SGMII signals are then transmitted via SGMII lanes 64 to the SGMII interface 36 of base band controller 28. Then, base band controller 28 may convert SGMII signals (IP protocol) into CPRI signals (radio signals), and send these radio signals to switch 52 via CPRI lanes 56. CPRI signals 58 are then transmitted from switch 52 to CPRI interface 4 of radio card 2 via CPRI lanes 62.

It should be understood that a path between backhaul interface BH2 through switch 52, Ethernet 32, base band controller 28, back through switch 52 to interface CPRI-2 may also be used to conduct communications if desired.

Figure 5:
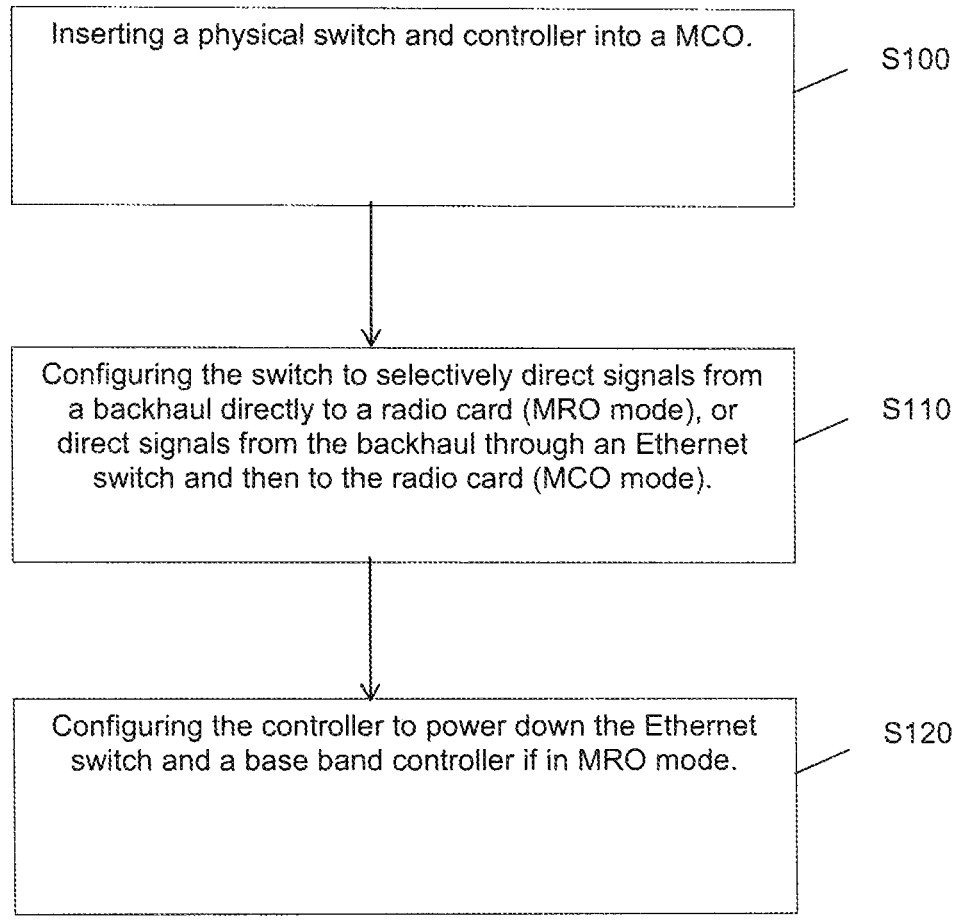
FIG. 5 is a method of configuring a single unit cell with a switching capability between MRO and MCO modes, in accordance with an example embodiment.

FIG. 5 is a method of configuring a single unit MxO 50 with a switching capability between MRO and MCO modes (as shown in FIGS. 3 and 4), in accordance with an example embodiment. The method may include a step S100 of inserting a switch 52 and controller 54 into a MCO 30 to produce a single unit MxO 50. Step S110 may include configuring the controller 54 to selectively redirect signals through switch 52 to provide MxO 50 with either MRO or MCO operations (as shown in FIGS. 3 and 4). Step S120 may include configuring controller 54 to send control signals to power down Ethernet switch 32 and base band controller 28 in an energy saving mode during MRO mode (as shown in FIG. 3A).

Figure 6:
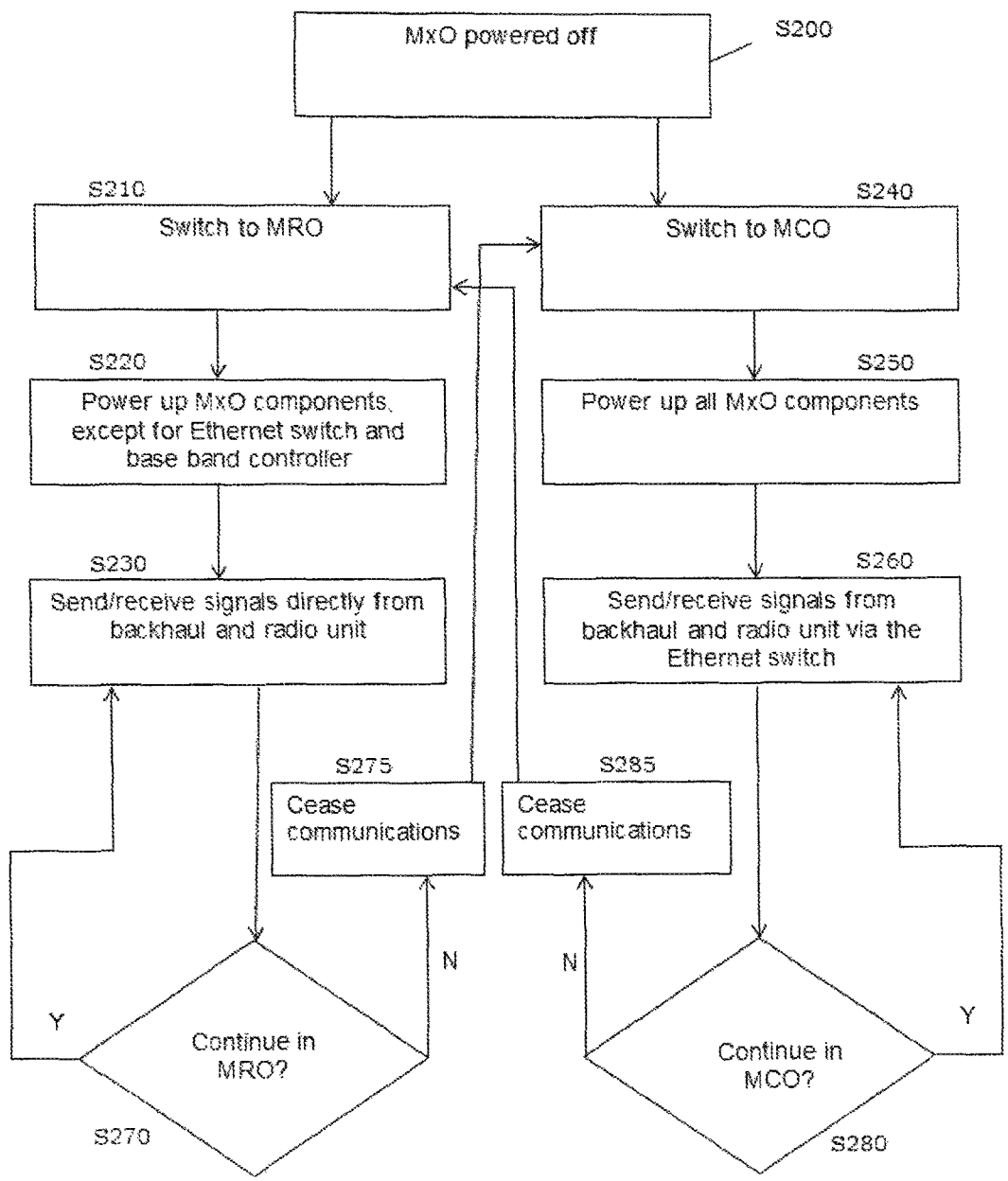
FIG. 6 is a method of using a single unit cell with a switching capability between MRO and MCO modes, in accordance with an example embodiment.

FIG. 6 is a method of using a single unit cell MxO 50 with a switching capability between MRO and MCO modes, in accordance with an example embodiment. Step S200 may include MxO 50 in a power 'off' mode. In step S210, controller 54 of MxO 50 may be manually activated to cause switch 52 to be switched a MRO mode (see FIG. 3A). Controller 54 may also alternatively cause switch 52 to be switched to a MCO mode (see FIG. 4), as shown in step S240, and this alternative mode is described in more detail herein. However, assuming MxO 50 is initially switched to MRO, then in step S220 controller 54 may cause components of MxO 50 to power on, with the exception of Ethernet switch 32 and base band controller 28 which are not utilized during MRO mode. In step S230, MxO 50 may then send and receive signals. In step S270, it may be decided to continue MRO operations indefinitely (in which case MxO 50 may continue to send and receive signals in step S230), or a decision to switch to MCO mode may be made.

In the event it is desired to switch from MRO mode to MCO mode, then in step S275 data communications for MxO 50 cease prior to controller 54 being manually activated to cause switch 52 to be switched to MCO mode (see FIG. 4) in step S240. In step S250, all MxO 50 components are powered up, including Ethernet switch 32 and base band controller 28. In step S260 MxO 50 may send and receive signals. In step S280, it may be decided to continue MCO operations indefinitely (in which case MxO 50 may continue to send and receive signals in step S260), or a decision to switch to MRO mode may be made (in which case data communications cease in step S285). Following step S285, controller 54 may switch MxO 50 back to MRO mode, as shown in step S210.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A single base station unit, comprising:
 a backhaul interface capable of transmitting and receiving data communications, the data communications being both internet protocol (IP) data and first radio signals;
 a radio card configured to exchange the data communications with the backhaul interface;
 a first controller configured to convert the IP data to second radio signals, the first controller being a base band controller, the first and second radio signals being radio wave signals capable of being transmitted using common public radio interface (CPRI) standards;
 a first switch capable of routing the IP data and the first radio signals, the first switch being configured to route the IP data between the backhaul interface and the first controller to be sent to the radio card as the second radio signals, and route the first radio signals directly between the backhaul interface and the radio card, wherein the single base station unit operates in a metro cell outdoor (MCO) mode if the first switch is routing the IP data, and the single base station unit operates in a metro radio outdoor (MRO) mode if the first switch is routing the first radio signals; and
 a second controller configured to command the first switch to operate the single base station unit in one of the MCO mode and the MRO mode, the second controller being configured to power down the first controller and the second switch if the single base station unit is operating in the MRO mode.

2. The single base station unit of claim 1, further comprising:
 a second switch to direct the IP data between the first switch and the first controller if the single base station unit is operating in the MCO mode, the second switch being an Ethernet switch.

3. The single base station unit of claim 2, wherein the second controller is configured to be remotely operated to command the first switch to operate the single base station unit in one of the MCO mode and the MRO mode.

4. The single base station unit of claim 1, further comprising:
 at least a second single base station unit configured to receive a portion of the first radio signals from a second backhaul interface of the single base station unit if the single base station unit is operating in the MRO mode.

5. A method of configuring a single base station unit having a backhaul interface capable of exchanging data communications with a radio card, the data communications including IP data and first radio signals, the method comprising:
 configuring a first controller in the single base station unit to convert the IP data into second radio signals, the first controller being a base band controller, the first and second radio signals being radio wave signals capable of being transmitted using common public radio interface (CPRI) standards;
 configuring a first switch in the single base station unit to route the IP data and the first radio signals, the first switch being further configured to route the IP data between the backhaul interface and the first controller to be sent to the radio card as the second radio signals, and route the first radio signals directly between the backhaul interface and the radio card;
 operating the single base station unit in a metro cell outdoor (MCO) mode if the first switch is routing the IP data;
 operating the single base station unit in a metro radio outdoor (MRO) mode if the first switch is routing the first radio signals;
 commanding the first switch to operate the single base station unit in one of the MCO mode and the MRO mode using a second controller; and
 powering down the first controller and the second switch if the single base station unit is operating in the MRO mode using the first controller.

6. The method of claim 5, further comprising:
 directing the IP data between the first switch and the first controller using a second switch if the single base station unit is operating in the MCO mode, the second switch being an Ethernet switch.

7. The method of claim 5, further comprising:

remotely operating the second controller to command the first switch to operate the single base station unit in one of the MCO mode and the MRO mode.

8. The method of claim 5, further comprising:

transmitting a portion of the first radio signals from a second backhaul interface of the single base station unit to at least a second single base station unit if the single base station unit is operating in the MRO mode.

9. A method of using a single base station unit having a backhaul interface capable of exchanging data communication with a radio card, comprising:

selecting, by a first switch controlled by a first controller, one of a metro cell outdoor (MCO) mode and a metro radio outdoor (MRO) mode, the first switch routing data communications, the data communications being both internet protocol (IP) data and first radio signals, the first switch routing the IP data between the backhaul interface and the radio card through a second controller in the MCO mode, the second controller being a base band controller configured to convert the IP data into second radio signals, the first and second radio signals being radio wave signals capable of being transmitted using common public radio interface (CPRI) standards, the first switch routing the first radio signals directly between the backhaul interface and the radio card in the MRO mode;

directing the IP data between the first switch and the second controller using a second switch if the single base station unit is operating in the MCO mode, the second switch being an Ethernet switch; and powering down, by the first controller, the second controller and the second switch if the single base station unit is operating in the MRO mode.

* * * * *